(12) United States Patent
Brunel et al.

(10) Patent No.: US 8,755,751 B2
(45) Date of Patent: Jun. 17, 2014

(54) WIRELESS COMMUNICATION APPARATUS HAVING MODULATED TX CLOCK SPUR CONTROL

(75) Inventors: Dominique Brunel, Antibes (FR); Laurent Noel, Le Cannet (FR)

(73) Assignee: ST-Ericsson SA, Plan-les-Ouates (CH)

( * ) Notice: Subject to any disclaimer, the term of this patent is extended or adjusted under 35 U.S.C. 154(b) by 132 days.

(21) Appl. No.: 13/574,912

(22) PCT Filed: Jan. 26, 2011

(86) PCT No.: PCT/EP2011/000346
§ 371 (c)(1),
(2), (4) Date: Jul. 24, 2012

(87) PCT Pub. No.: WO2011/092003
PCT Pub. Date: Aug. 4, 2011

(65) Prior Publication Data
US 2012/0295557 A1 Nov. 22, 2012

(30) Foreign Application Priority Data

Jan. 26, 2010 (EP) .................................... 10368011

(51) Int. Cl.
*H04B 1/00* (2006.01)
(52) U.S. Cl.
USPC .... 455/63.1; 455/501; 455/114.1; 455/114.2; 455/296

(58) Field of Classification Search
USPC ............ 455/501, 63.1, 73, 114.1, 114.2, 296
See application file for complete search history.

(56) References Cited

U.S. PATENT DOCUMENTS

| 6,861,900 B2 * | 3/2005 | Smidth .......................... 329/304 |
| 2002/0094034 A1 * | 7/2002 | Moriyama ..................... 375/271 |
| 2003/0100280 A1 | 5/2003 | Kusbel et al. |
| 2005/0255881 A1 | 11/2005 | Yamamoto et al. |
| 2006/0146145 A1 | 7/2006 | Kawamoto |
| 2009/0138745 A1 | 5/2009 | Dorsey et al. |
| 2010/0041357 A1 * | 2/2010 | Wang et al. .................... 455/208 |

* cited by examiner

*Primary Examiner* — Tuan Pham
(74) *Attorney, Agent, or Firm* — Coats & Bennett, P.L.L.C.

(57) ABSTRACT

A wireless telecommunication apparatus comprising—a baseband for the purpose of generating and receiving baseband signals; —a RF transceiver for the purpose of transmitting and receiving a RF signals, —at least one centralized clock derived from at least one central oscillator; —at least one individual element located within said apparatus and having a EMI coupling with said RF transceiver, and which clocking is likely to generate spurs being modulated with the Tx carrier of said RF transceiver; Characterized in that it further includes: —a least one controllable clocking system for said at least one individual element; —a general control unit (UCM) for the purpose of performing a contextual analysis of the current mode of operation of said wireless telecommunications and, in response to said contextual analysis, for determining a clocking frequency which results in modulated Tx clock spurs out of the receive bands.

15 Claims, 8 Drawing Sheets

WIRELESS COMMUNICATION APPARATUS HAVING MODULATED TX CLOCK SPUR CONTROL

TECHNICAL FIELD

The invention relates to the field of wireless communications and more particularly to a wireless communication apparatus including clock spur control.

BACKGROUND ART

Until recently, mobile wireless equipment used separate Integrated Circuits (ICs) for the Radio Frequency (RF) transceiver, the baseband (BB) processor and the Power Management Unit (PMU). In the context of the permanent perpetual quest for cost reduction, the approach taken by most IC vendors is that of a single chip, made up of either a single RF CMOS die, or multiple separate dies, which integrates into a single package all three previously listed ICs, namely, RF, BB and PMU into a single package.

FIG. 1 illustrates the general architecture of a multiple-band 2G/3G phone 100 consisting of a quad band 2.75G (EGPRS), triple band 3G (HSPA+) with 3G receive diversity.

There is illustrated the concept of a RF-BB-PMU Integrated circuit die 190 particularly advantageous because of the cost saving in the manufacturing process. Indeed, thanks to the use of such a single die 190, the whole telecom pipe of the mobile phone now only requires very few extra additional components to make a phone call: one or several Power Amplifier(s) (PA) and its associated front-end circuitry such as RF bandpass filters, duplexers, antenna switch etc.

More precisely, FIG. 1 shows the following components which are typical of a modern mobile:

Label 110: General architecture of the mobile phone's RF front-end.
Label 111: Antenna switch. Allows switching from one frequency band to another.
Label 112: 3G (HSPA) duplexer. Connects TX and RX path to the antenna switch.
Provides RF isolation between RF tx and RF rx chains,
Label 113: 2.75 G (EGPRS) power amplifiers
Label 114: 3G (HSPA) power amplifiers
Label 115: Diversity receiver RF bandpass filters
Label 190: Single die/single-chip RF (label 120)-BB(label 130)-PMU (label 140) IC.
Label 120: Multi-standard, multi-band RF transmit/receive (transceiver) IC.
Label 130: Digital baseband (DBB) IC There is thus shown one illustrative example of the integration, within one single die 190, of a RF Front End circuit 110, a 2G/3G RF transceiver 120, a baseband 130, a PMU unit 140 and possibly DDR memory 150, being either external or internal.

RF Front-End circuit 110 supports quad band 2G (Band II, III, V, VIII EGPRS), triple band 3G (WCDMA I, II, III) which is typical of recent mobile phone architecture, the selection of the particular mode/band being performed by means of an antenna switch 111 which directs the signal to the appropriate set of front end filters 112. Conversely, antenna switch 101 directs the transmit signal generated by the appropriate 2G or 3G Power amplifiers, respectively 113 and 114, to the antenna.

2/3G transceiver 120 includes the conventional circuits required for achieving a 2G or 3G mobile communication, such as, in the receiving chain, Low Noise amplifiers (LNA) 121, a Rx VCO Frequency synthesizer 122 with appropriate division circuits (represented by local divider LO Div), a circuit 123 achieving programmable Gain amplifier (PGA), Analog to digital converter (ADC) as well as DSP processing. On the transmitting chain, transceiver 120 includes a circuit 126 achieving PGA, Digital to Analog (DAC) conversion as well as DSP processing, a Tx VCO frequency synthesizer 125 associated with dividing circuits (LO Div), and conventional digitally controlled Gain amplifier 124. Transceiver 120 further includes appropriate timing circuits 126 as well as a RF-BB baseband interface 127 for interfacing the baseband 130. For the sake of clarity, the different control, data and clock signals which are represented in FIG. 1 (such as RFB-Bi_EN, RX data 1, RX data 2, TX data 1, SYSCLKEN, SYSCLK) are conventional and known to the skilled man and do not need any further discussion.

Similarly, baseband 130 achieves communication between the transceiver 120 (through interface 127) with different devices and peripherals, such as two cameras 160, two displays 170, a USB device 180 through appropriate data and control leads (including CLK clocks and Chip Select CSi) as well as external DDR memory.

It can be seen that the integration of those components in a single die clearly reduces the cost of manufacturing a handset since the telecom pipe of the mobile phone now only requires very few extra additional components to make a phone call: one or several Power Amplifier(s) (PA) and its associated front-end circuitry such as RF bandpass filters, duplexers, antenna switch etc.

While the single chip RF, BB, PMU presents a significant cost reduction of the entire mobile phone chipset, there are significant EMI problems to be considered.

Indeed, it has been noticed that with such an architecture, the RF transmit modulator chain is victim of a digital aggressor activity creating clock and/or data activity related frequency spurs.

Such aggressor might be, for instance and without any limitation, the camera interface(s) digital bit stream and associated clock, the display interface(s) digital bit stream and associated clock, the USB port, the external memory data and clock bus, Power management Unit (PMU) internal clocks, digital Baseband clock spurs etc. . . .

For the sake of clarity, the following "aggressors" are highlighted in FIG. 1: the DDR memory 150, the cameras 160, the display 170, the USB interface 180 etc. . . . which pollute the "victim" being the RF block of 2G/3G RF transceiver 120.

The pollution of the transmitter block of the RF chain results in modulation of the noise generated by EMI contributors through the uplink transmission carrier, thus causing pollution to the RF receiver of the same mobile phone or even the RF receivers of the other mobiles located in a close vicinity.

In order to minimize the effects of pollution generated by the different "aggressors" some techniques have already been used.

One conventional solution which is known in the art consists in clearly isolating, on a time division basis, the operating of both RF transmitter and the digital base band. This know solution is designated under the general reference of Time Division Isolation (TDI) . . . . And can be used in the context of the GSM with bursts accesses to the RF transmission. Therefore, one can avoid, by means of such TDI technique, the simultaneous use of the victim with the aggressor(s).

The TDI can clearly be used in the case of GSM showing bursted access to the RF transceiver . . . however, 3 G communications are full duplex and further requires continuous use of both the RF transmitter and the RF receiver, thus preventing any possibility of TDI.

Furthermore, it has been noticed that the so-called TDI technique also results in some waste of the digital processing resources offered by the baseband which remains idle during the activation of the RF transmitter (for instance).

Such waste of resources is simply not acceptable in the perspective of the design of new mobile phones which incorporate highly sophisticated multimedia functionalities requiring a great number of processing resources.

At last, the TDI technique does not prevent the emitter of one mobile, for instance a first mobile emitting in the uplink to its base station, to spoil the receiver of a second mobile located in the neighborhood of said first mobile, when the second is receiving in downlink from its own base station.

Other techniques are known for improving the isolation of the RF receiver which are known in the art. Such techniques are based on the use of specific layout arrangements of the microelectronics circuits (Deep Nwell, stop layers), special shielding circuits or frequency uses for the purpose of reducing, as much as possible the effect of the transmission to the receiver located in a neighboring mobile.

It is highly desirable to improve additional technique which still improves the protection of the RF transmission of mobile phones.

SUMMARY OF THE INVENTION

It is an object of the present invention to provide a new technique for facilitating the cellular integration, particularly the digital (MCU/DSP) and one or more RF subsystem.

It is another object of the present invention to provide an new wireless communication apparatus which allows simultaneous use of RF subsystem of a mobile phone, together with digital baseband operating in the same package while avoiding the desensitizing of the RF subsystem.

It is an object of the present invention to provide a new clocking architecture suitable for a mobile telephone offering multiple multimedia functionalities.

It is a further object of the present invention to provide a new wireless mobile which includes dynamic adaptation of the clocking system of peripherals therein include so as to control the modulated Tx clock spurs and thus disturbance of the RF transmission both to the considered mobile and the neighboring telephones.

These and other objects of the invention are achieved by means of a wireless telecommunication apparatus comprising:
 a baseband for the purpose of generating and receiving baseband signals;
 a RF transceiver for the purpose of transmitting and receiving a RF signals,
 at least one centralized clock derived from at least one central oscillator;
 at least one individual element located within said apparatus and having a EMI coupling with said RF transceiver, and which clocking is likely to generate spurs being modulated with the Tx carrier of said RF transceiver;
The apparatus is characterized in that it further includes:
 a least one controllable clocking system for said at least one individual element;
 a general control unit (UCM) for the purpose of performing a contextual analysis of the current mode of operation of said wireless telecommunications and, in response to said contextual analysis, for determining a clocking frequency which results in modulated Tx clock spurs out of the receive bands.

In one particular embodiment, the general control unit uses one of the following information for determining the clocking frequency to be used for the individual component:
 the Tx modulated carrier frequency,
 the Tx modulated carrier power,
 the DL received carrier power,
 the operating frequency band (DD & DG),
 the mode of operation (2G, 3G)
 the aggressor activity Preferably, the central control unit controls the clocking frequency of a memory storage, such as a DDR storage.

In one embodiment, the central control unit also controls the clocking of a display interface, a USB interface, a camera interface.

Preferably, a master clock is used which is based on a high frequency of 4992 Mhz.

In one embodiment, the control of the clocking frequency is based on the use of a programmable divider based on a fixed ratio divider associated with a sigma-delta conversion.

The invention is particularly suitable for achieving a 2G, 3G or LTE mobile phone incorporate highly sophisticated multimedia functionalities. Alternatively, it can be used for carrying out a Portable Document Assistant.

DESCRIPTION OF THE DRAWINGS

Other features of one or more embodiments of the invention will best be understood by reference to the following detailed description when read in conjunction with the accompanying drawings.

FIG. 3 shows two RF spectra: top line shows the RF transmitter spectrum (ie the victim's spectrum) modulated by the DDR clock spurs (the aggressor) observed in RF RX band of GSM900. Bottom line shows the same RF spectrum with the aggressor and the victim being isolated in the time domain (using TDI).

FIG. 3 shows two RF spectra: top line shows the RF transmitter spectrum (ie the victim's spectrum) modulated by the DDR clock spurs (the aggressor) observed in RF RX band of GSM900. Bottom line shows the same RF spectrum with the aggressor and the victim being isolated in the time domain (using TDI).

DESCRIPTION OF THE PREFERRED EMBODIMENT

It will now be described how one can improve the integration of digital baseband systems and circuits with one or more RF subsystem. Clearly, the method and system being described hereinafter are particularly suitable for the purpose of designing an new mobile phone fitted with multimedia and enhanced functionalities, such as Global Positioning System (GPS), Bluetooth, wireless lan, 2G and 3G, a high resolution camera and display(s) a TV out capability etc.

Clearly, the clocking architecture which will be described is suitable for allowing combination of wide number of features and functions such as mentioned above, but can also be used for a limited subset of functionalities.

Figure 1:
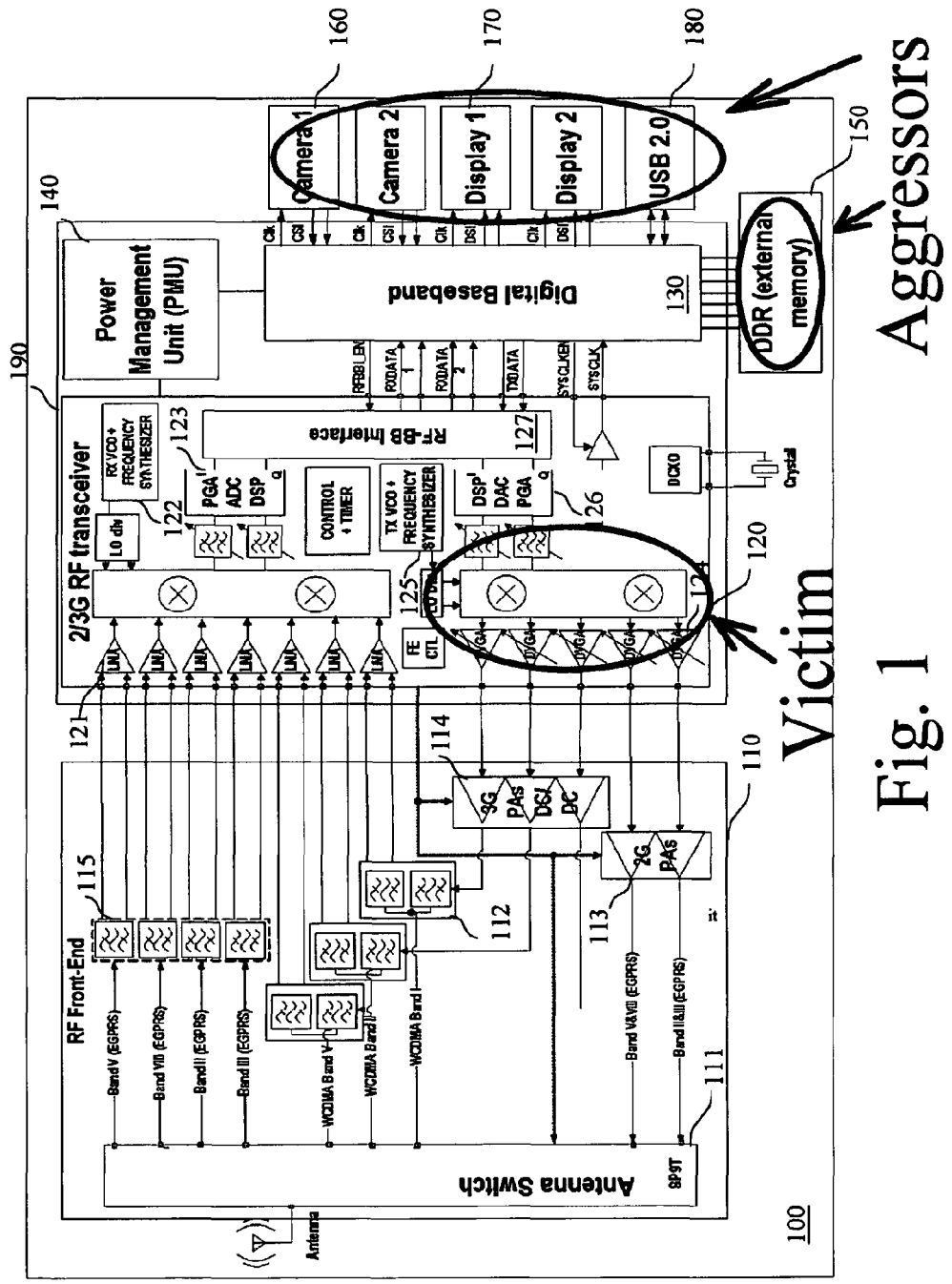
FIG. 1 shows an illustrative architecture of a mobile telephone including RF transceiver and different peripherals.

Furthermore, it should be clear that the embodiments which will be described hereinafter should not be restricted to the telecommunication standards, nor to the frequency bands nor to the combination of bands which are shown in the illustrative example of FIG. 1.

The teaching of the invention is general and is likely to be used in a wide range of applications.

Furthermore, the invention which will be described hereinafter with details is applicable to both 2G (EGPRS) systems and 3G systems (FDD-WCDMA all releases including Long Term Evolution), and can be advantageously incorporated in any recent architecture, such as typical architecture of FIG. 1.

Conventionally, each individual component or functional entity which is incorporated into a mobile phone has its own clock signal which is generated by one Phase Locked loops so that, in the whole phone, no less than 10 PLLs can be simultaneously (and asynchronously) operated, each one corresponding to its particular functional entity.

Figure 2A:
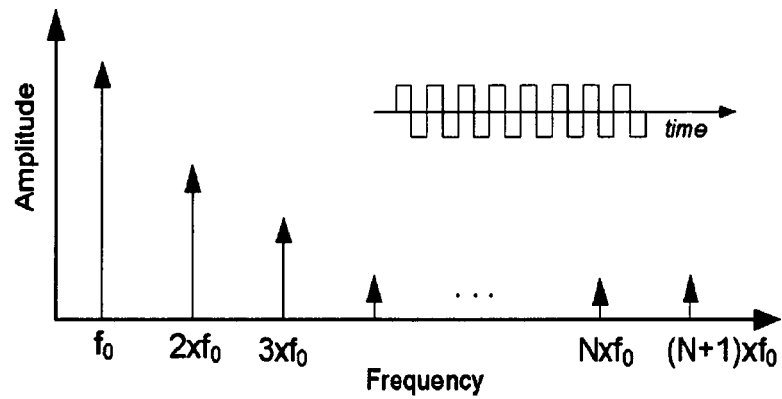
FIGS. 2a and 2b illustrates the basic spectral properties of two particular aggressors in the case of continuous clock harmonics and pulsed clock source.
Figure 2B:
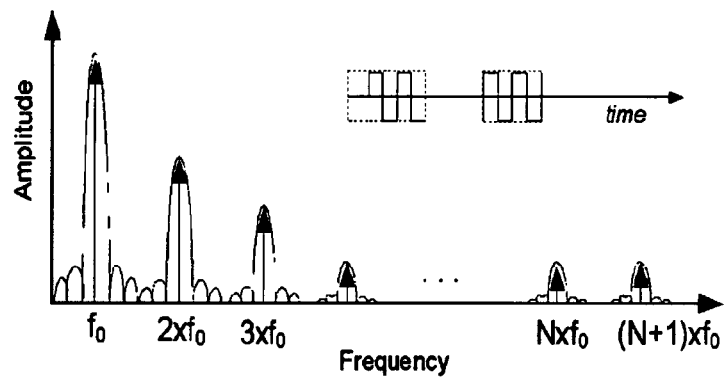

The clocking of all those individual components—or aggressors—result in the generation of EMI interference in the receive band. Aggressor's basic spectral properties are illustrated in FIGS. 2a and 2b as follows:

FIG. 2a: continuous clock harmonics,

FIG. 2b: pulsed clock source.

Among those, the DDR storage—conventionally clocked at a frequency of 104 Mhz—shows to be a critical contributor of EMI interference and thus generates a high number of spurs. Those are unfortunately introduced within the transmission band and might thus spoil the RF receiver of the apparatus or even a RF receiver of a neighboring mobile.

Figure 3:
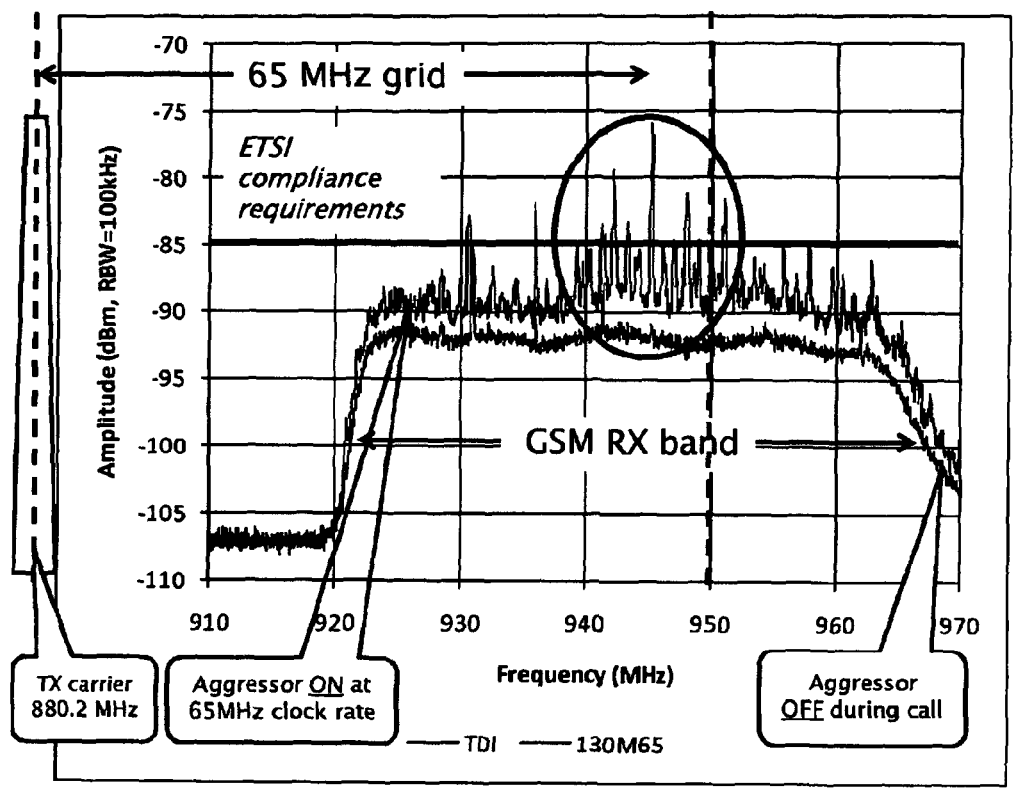
FIG. 3 particularly illustrates the generation of spurs coupled to the RF transmitter chain resulting from a DDR storage being clocked at a frequency of 65 Mhz.

FIG. 3 particularly illustrates the situation of a DDR storage being clocked at a frequency of 65 Mhz, and which is coupled to a RF transmitter operating at a frequency of 880.2 Mhz. One sees the profile of the Rx band (between 910 Mhz and 970 Mhz) in the two situations where the aggressor is idle (Aggressor OFF during call) and in operation (Aggressor ON at 65 Mhz clock rate).

One sees that, in the Rx band, the noise resulting from the clocking of that memory is modulated on the transmission carrier. One thus sees a number of pulses centered at a value of 65 Mhz above the Tx channel, that is to say at a value near 945 Mhz which is comprised within the GSM Rx band.

It can be seen that the spurs are violating the ETSI compliance specification at 65 Mhz offset with respect to the 880.2 Mhz Tx carrier.

Figure 4:
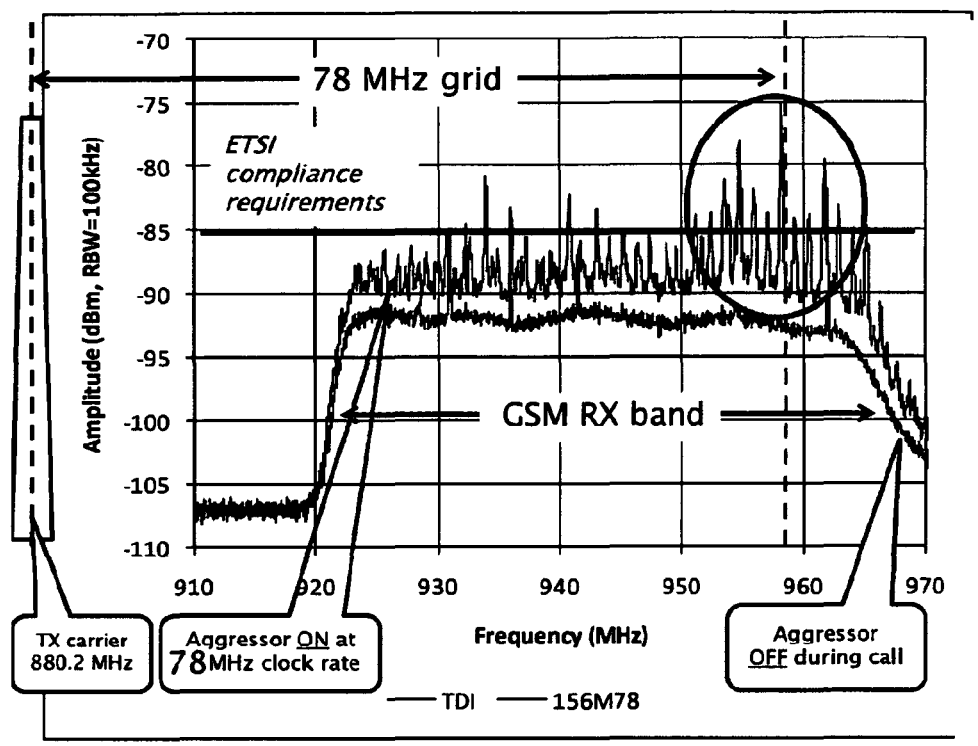
FIG. 4 particularly illustrates the generation of spurs coupled to the RF transmitter chain resulting from a DDR storage being clocked at a frequency of 78 Mhz.

FIG. 4 shows the same chart in the case of a DDR storage which is now operated at a frequency of 78 Mhz. One sees now that with a 78 Mhz clock grid, the violation of the ETSI compliance specification now occurs at a frequency of 78 Mhz above the Tx channel.

Because of the violation of the ETSI specification, the number of spurs might spoil the Rx band of the mobile phone or any Rx band of any neighboring mobile phone.

In order to minimize the effects of the spurs generated by the DDR storage, one embodiment of the invention uses a dynamic control of the clocking of the latter so as to ensure that the spurs do not fall into the Rx band.

More particularly, when the mobile phone receives control information from the base station according to which the Tx transmission is being switched to a new value, the clocking of the DDR is dynamically updated so as to avoid, again, that the spurs deriving from the DDR storage clocking fall into the Rx band.

Similarly, any other individual "aggressor", including the cameras 160, the display 170, the USB interface 180 etc. . . . which are likely to generate—through the modulation of the considered Tx transmission—spurs into the Rx band are clocked at a frequency which is dynamically changed in accordance with the value of the Tx transmission carrier.

It is therefore proposed to arranged a whole clocking system of all individual elements composing a mobile phone, and identified as being a possible aggressor" with respect to the Tx RF system, which clocking is dynamically controlled in accordance with a set of parameters, including the value of the Tx carrier.

In one embodiment, the clocking of the individual components is also defined in accordance of:

the Tx carrier, the Duplex Gap (DG) separating the Tx band (uplink) and the Rx band (downlink);

the Duplex Distance (DD) separating the carriers of the uplink band (Tx) and the downlink band (Rx).

Figure 5:
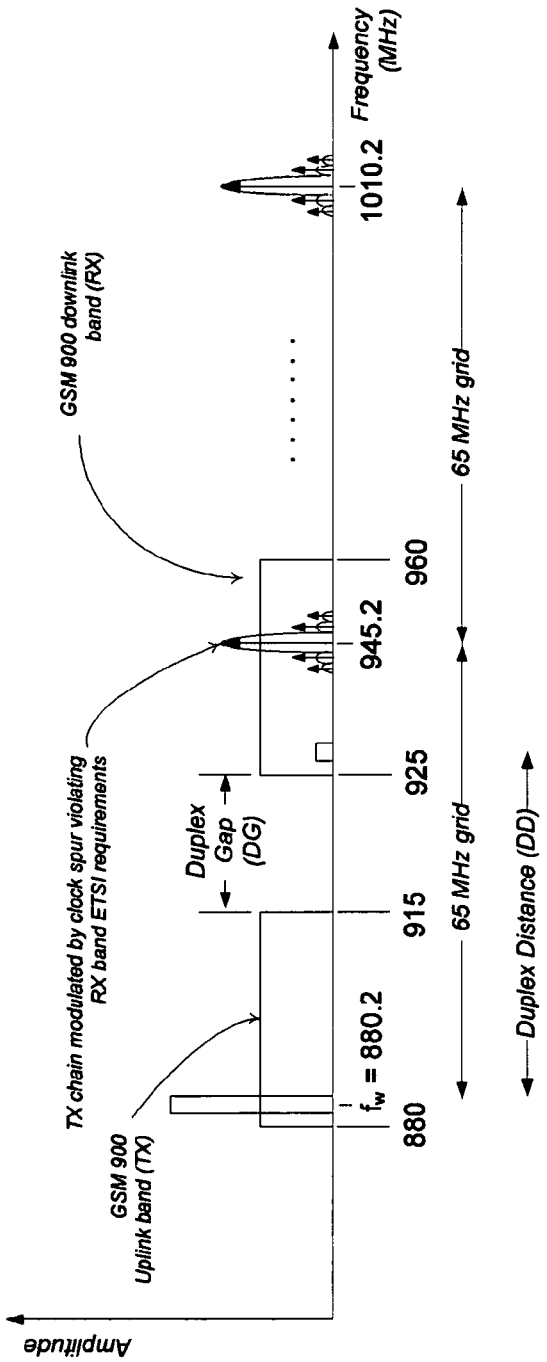
FIG. 5 illustrates the respective position of the different modulated Tx clock spurs in the case of a GSM900 communication and a 65 Mhz grid

FIG. 5 illustrates the respective position of the different modulated Tx clock spurs in the case of a GSM900 communication and a 65 Mhz grid (corresponding to a DDR storage operating at 65 Mhz):

fw=880.2 (Tx carrier)

GSM900 Uplink band (Tx): [880-915 Mhz]

GSM900 Downlink band (Rx): [925-960 Mhz]

In that example, the Duplex Gap (DG) is being equal to 10 Mhz and the Duplex Distance (DD) is set to 45 Mhz. In such example, one sees that the Tx chain modulated spurs occur at positions of 945.2 Mhz . . . . And 1010.2 Mhz, thus violating the ETSI requirements.

With respect to FIGS. 6 and 7 there will now be described how one can control the position of the modulated Tx clock spurs generated by one individual aggressor (such as the DDR memory again).

Figure 6:
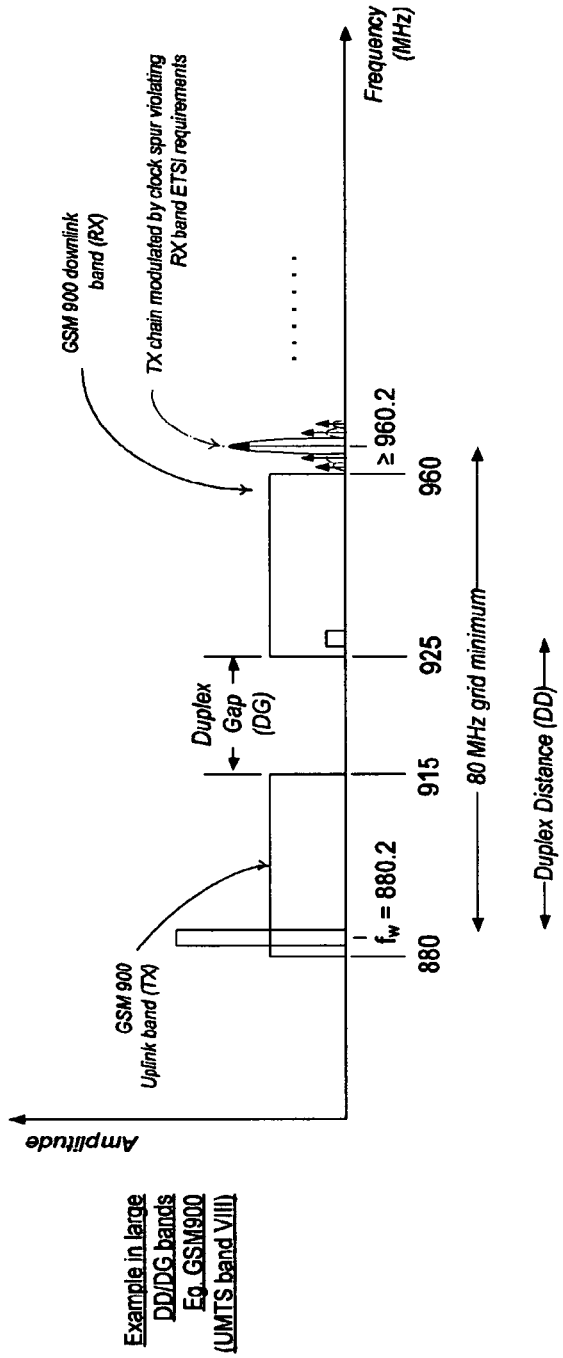
FIG. 6 illustrates the control of the modulated Tx clock spurs for the case of large DD/DG ratios.

FIG. 6 particularly illustrates the control of the position of the modulated Tx clock spurs in the case of a large DD/DG ratio.

One sees that one can achieve the "pushing" of the modulated Tx clock spurs out of the receive band by using a 80 Mhz grid minimum. Indeed, in that case, the spurs are located at a frequency of 960.2 Mhz, that is to say beyond the [925-960] Rx band.

Figure 7:
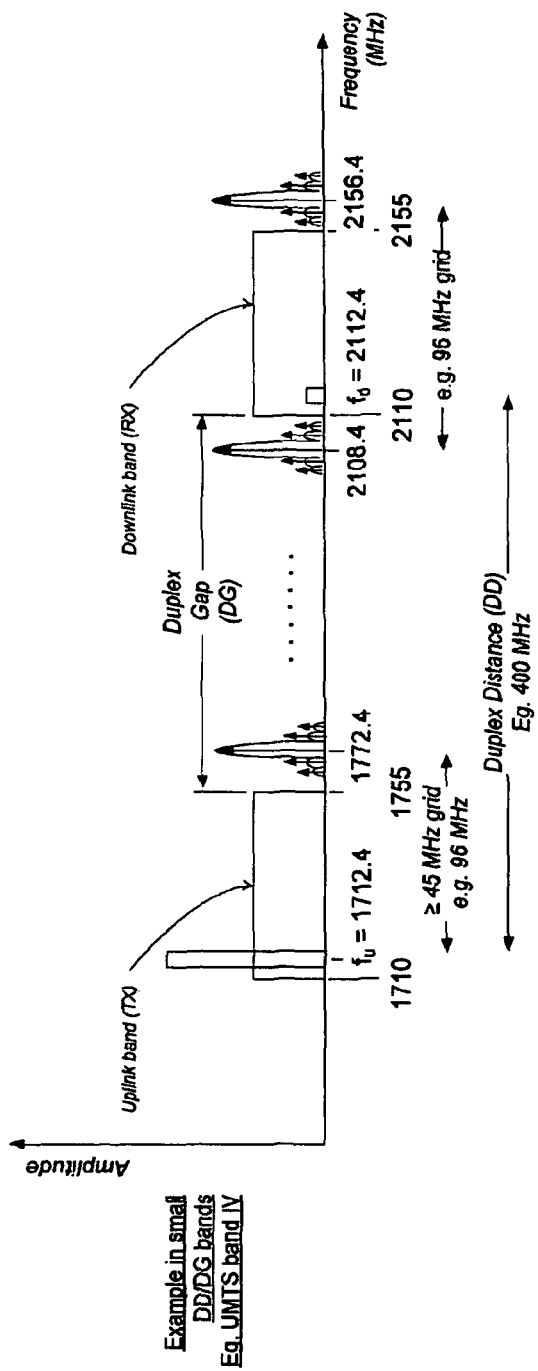
FIG. 7 illustrates the control of the modulated Tx clock spurs for the case of small DD/DG ratios.

FIG. 7 particularly illustrate the control of the position of the modulated Tx clock spurs in the case of a small DD/DG ratio, such as, for instance in the case of UMTS band IV. One sees that one can eliminate the Tx clock spurs from the Rx band provided that the clocks operated at a frequency superior than 45 Mhz . . . . Therefore, with a clocking set at 96 Mhz, the modulated Tx clock spurs occur at values being 1772.4 Mhz, . . . 2108.4 Mhz, 2156.4 Mhz, that is to say out of the to receiving band [2110-2155 Mhz].

It can therefore be seen that each individual aggressor, or contributor to RFI noise within the Tx transmission block, can be clocked at one individual frequency which can be controlled so as to continuously remain out of the Rx band being considered.

This is achieved by means of the use of a master PLL clock source, combined with a set of programmable frequency dividers, each associated with one individual functional element identified as an possible "aggressor", which are programmed under the control of a centralized control unit having full knowledge of the value of the Tx and Rx band characteristics.

In one embodiment, all components and more generally all peripherals which are identified to contribute to the generation of spurs within the transmission band are clocked by a controllable clocking system which is under control of one single centralized control unit—a so-called Use Case Manager (UCM) which, in accordance with one embodiment, has high-level vision of the contextual operations of the mobile telephone, and particularly any frequency switching of the RF transmitter controlled by the base station, so as to precisely generate the appropriate control parameters for controlling the different clocks required by the different elements In one particular embodiment, the so-called Use Case Manager (UCM) detects:
the Tx modulated carrier frequency,
the Tx modulated carrier power,
the DL received carrier power,
the operating frequency band (DD & DG),
the mode of operation (2G, 3G)
the aggressor activity By using such information, the USC can provide adequate control information for all the frequency dividers generating the different clocks required by the to individual aggressors so as to particularly adjust the clocking in critical cases. For instance, if the USB interface is not being used, the USC will control the frequency division so as to use the default clocking frequency etc. . . .

Figure 8:
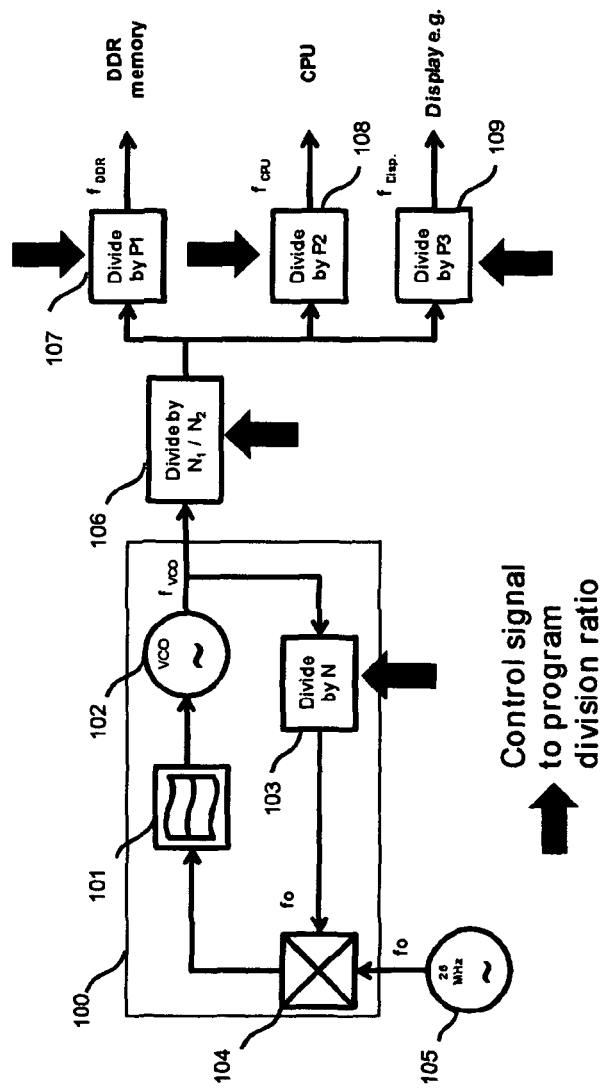
FIG. 8 illustrates one embodiment of a clocking architecture which allows dynamic control of the modulated Tx clock spurs in accordance with one embodiment.

FIG. 8 illustrates one particular and illustrative embodiment of a whole clocking architecture which allows dynamic control of the modulated Tx clock spurs in accordance with one embodiment.

The architecture is based on at least one master clock reference, such as a first high frequency master reference operating at $f_{VCO}$, operating at a frequency between about 4 and 5 Ghz, and which can be used for generating all or most of the clocks used by the different constituents of the mobile phone, including the possible aggressors.

One sees a Phase Locked Loop (PLL) which is formed by means of oscillator 102 operating at $f_{VCO}$ the output of which being connected to the input of a a programmable divider by N circuit 103 and which output is connected to the a first input of a phase comparator circuit 104, a second input of which receives the output of a 26 MHz reference crystal oscillator 105. Note that this conventional PLL architecture may rely upon integer N or fractional N division ratios.

The PLL comprising blocks 101, 102, 103, and 104 is used for generating all frequency clock references, particularly required by the baseband (or also entitled "CPU"), the memory (or also known as "DDR") and display etc. . . . For instance, the $f_{VCO}$ frequency is divided by a programmable divider 106 which allows any division between N to $N_1$ so as to provide a so called variable Digital clock which can be further divided by a dedicated programmable divider 107 used for clocking the Digital Signal Processor (DSP) or also called "Central Processing Unit" (CPU), as well as the divider 107 to feed the external DDR memory, the divider 109 to feed the camera interfaces etc. . . .

Note that programmable division ratios N1, N2 of divider 106, P1 of divider 107, P2 of divider 108 and P3 of divider 109 can be either implemented in integer N or as fractional division ratios depending on the mobile phone application (number of bands, number of telecommunication standards being supported, etc. . . . ).

It should be noticed that the architecture which is illustrated in FIG. 8 is only one illustrative example of how achieving one complete set of clocking signals which are derived from one single centralized master clock. In particular, the architecture can be adapted for the purpose of introducing some clock spreading techniques which are out of the scope of the present invention, but which may be advantageously used by the skilled man.

It can be seen in FIG. 8 that all the different clocks are under control of the Use Case Manager. This is represented by the control leads of programmable dividers 103, 106, 107, 108 and 109.

Accordingly, the Use Case Manager is thus able to precisely define and control the clocking of each "aggressor", in accordance with the particular context of use of the mobile phone, including the Tx modulated carrier frequency, the Tx modulated carrier power, the DL received carrier power, the operating frequency band (DD & DG), the mode of operation (2G, 3G), the clocking of the aggressor being considered, Basically, the master PLL is arranged so as to provide all clocks—high speed and low speed—which are required for embodying a recent mobile phone including a wide range of multimedia functionalities.

Note that the concept of frequency evasion presented in this invention can also be implemented using separate PLLs for each circuit which requires a digital clock. In this case, each PLL fall under the control of the Use Case Manager.

ADVANTAGE OF THE INVENTION

The invention achieves the arrangement of a centrol clock system (use case manager) which can be finely adjusted so as to minimize direct injection of the different clocks available within the integrated chip or they harmonics, and also the pushing/pulling effect of the clocks on the TX oscillator.

By achieving the adjustement of the frequency Fclk of the clocks so as to to avoid that one harmonique (n×Fclk) comes into interference with either the Rx band or the Tx band, direct injection is reduced.

But above all, by properly selecting the individual clocks used by some components, the use case manager avoids that a Low frequency (Pushing) or a High Frequency (Pulling) clock (or its harmonics), interferes with the Tx modulation process, and thus resulting in the generation of two spurs (one spur and its images) existing at the frequency Fvco+Fclk and Fvco−Fclk.

Push and Pull can thus be reduced

The invention claimed is:
1. A wireless telecommunication apparatus comprising:
a baseband for the purpose of generating and receiving baseband signals;
a RF transceiver for the purpose of transmitting and receiving a RF signals;
at least one centralized clock derived from at least one central oscillator;
at least one individual element located within said apparatus and having a EMI coupling with said RF transceiver, and which clocking is likely to generate spurs being modulated with the Tx carrier of said RF transceiver, said at least one individual element further comprising:
a least one controllable clocking system for said at least one individual element;
a control unit for the purpose of performing a contextual analysis of the current mode of operation of said wireless telecommunications and, in response to said contextual analysis, for determining a clocking frequency which results in modulated Tx clock spurs out of the receive bands.

2. The wireless telecommunication apparatus according to claim 1, wherein said control unit uses one of the following information for determining said frequency:
   a Tx modulated carrier frequency,
   a Tx modulated carrier power,
   a DL received carrier power,
   an operating frequency band,
   a mode of operation, and
   an aggressor activity.

3. The wireless telecommunication apparatus according to claim 1, wherein said individual element is a memory storage.

4. The wireless telecommunication apparatus according to claim 1, wherein said individual element is a display.

5. The wireless telecommunication apparatus according to claim 1, wherein said individual element is a USB interface.

6. The wireless telecommunication apparatus according to claim 1, wherein said individual element is a camera interface.

7. The wireless telecommunication apparatus according to claim 1, further comprising a centralized master clock operating at a frequency between 4 and 5 Ghz.

8. The wireless telecommunication apparatus according to claim 7, further comprising multiple phase lock loops, each being under the control of said control unit.

9. The wireless telecommunication apparatus according to claim 1, further comprising a programmable divider.

10. The wireless telecommunication apparatus according to claim 9, wherein said programmable divider is based on a fixed ratio divider associated with a sigma-delta conversion.

11. The wireless telecommunication apparatus according to claim 1, wherein said control unit dynamically updates the clocking of said element in response to a change of a transmission carrier controlled by a base station.

12. The wireless telecommunication apparatus according to claim 1, wherein said wireless telecommunication apparatus is a 2G mobile phone.

13. The wireless telecommunication apparatus according to claim 1, wherein said wireless telecommunication apparatus is a 3G mobile phone.

14. The wireless telecommunication apparatus according to claim 1, wherein said wireless telecommunication apparatus is a Long Term Evolution mobile phone.

15. The wireless communication apparatus according to claim 11, wherein said wireless telecommunication apparatus is embodied in a portable assistant document.

* * * * *